(12) United States Patent
Gaio et al.

(10) Patent No.: US 6,200,041 B1
(45) Date of Patent: Mar. 13, 2001

(54) DATA TRANSFER SYSTEM INCORPORATING OPTICAL FIBER LINK MODULE WITH INTERNAL ELECTROMAGNETIC SHIELD

(75) Inventors: David P. Gaio; Raymond J. Thatcher; Paul J. Sendelbach, all of Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/457,285

(22) Filed: Dec. 8, 1999

Related U.S. Application Data

(62) Division of application No. 08/928,119, filed on Sep. 12, 1997, now Pat. No. 6,085,006.

(51) Int. Cl.[7] .................. G02B 6/00; G02B 6/36
(52) U.S. Cl. .................................................. 385/92
(58) Field of Search ........................ 385/80–93, 147, 385/6; 439/567, 572, 577, 352; 361/785, 752

(56) References Cited

U.S. PATENT DOCUMENTS

| | | | |
|---|---|---|---|
| 4,614,836 | 9/1986 | Carpenter et al. | 174/51 |
| 4,678,264 | 7/1987 | Bowen et al. | 350/96.2 |
| 4,798,430 | * 1/1989 | Johnson et al. | 385/78 |
| 4,993,803 | * 2/1991 | Suverison et al. | 385/88 |
| 5,039,194 | 8/1991 | Block et al. | 383/88 |
| 5,069,522 | * 12/1991 | Block et al. | 385/39 |
| 5,071,219 | * 12/1991 | Carden et al. | 385/78 |
| 5,202,943 | 4/1993 | Carden et al. | 385/92 |
| 5,323,299 | 6/1994 | Weber | 361/818 |
| 5,416,871 | 5/1995 | Takahashi et al. | 385/88 |
| 5,434,747 | 7/1995 | Shibata | 361/753 |
| 5,470,259 | 11/1995 | Kaufman et al. | 439/607 |
| 5,528,408 | 6/1996 | McGinley et al. | 359/152 |
| 5,546,281 | 8/1996 | Poplawski et al. | 361/752 |
| 5,864,331 | 1/1999 | Anand et al. | 345/126 |
| 5,901,263 | 5/1999 | Gaio et al. | 385/92 |

FOREIGN PATENT DOCUMENTS

| | | |
|---|---|---|
| 2297007 | 7/1996 | (GB). |
| 4165312 | 7/1992 | (JP). |
| 4230978 | 8/1992 | (JP). |
| 4270305 | 9/1992 | (JP). |

OTHER PUBLICATIONS

Jarvela, R.A., *IBM Technical Disclosure Bulletin,*, vol. 27 No. 8, Jan. 1985 pp. 4737–4738*.

Soderstrom, et al., *CD Laser Optical Data Links for Workstations and Midrange Computers*, Electronic Components and Technology Conference, Jun. 1993*.

* cited by examiner

*Primary Examiner*—Akm E. Ullah
(74) *Attorney, Agent, or Firm*—Wood, Herron & Evans, L.L.P.

(57) ABSTRACT

The invention provides an internal electromagnetic shield that prevents the radiation of electro-magnetic emissions from electro-optical components in high speed data transfer systems. The present invention provides an internal shield with at least one aperture to allow the connector portion of an electro-optic component to pass through for connection to an optical fiber. By providing an internal shield, electromagnetic interference (EMI) is substantially reduced without interfering with the mechanical connection between an electro-optical component and an optical fiber. The internal shield typically is formed of a thin metallic sheet having apertures to receive the connector portion of electro-optical components. In a shield for an input/output device, which includes an optical signal generator and optical signal receiver, the shield may include two bores.

22 Claims, 9 Drawing Sheets

DATA TRANSFER SYSTEM INCORPORATING OPTICAL FIBER LINK MODULE WITH INTERNAL ELECTROMAGNETIC SHIELD

This application is a divisional of U.S. patent application Ser. No. 08/928,119, filed on Sep. 12, 1997 now U.S. Pat. No. 6,085,006 by David P. Gaio et al., which application is incorporated by reference herein.

GOVERNMENT RIGHTS

This invention was made with U.S. Government support under Cooperative Agreement F33615-94-2-1582 awarded by the U.S. Department of Air Force. The government has certain rights in the invention.

FIELD OF THE INVENTION

The invention is generally related to an internal shield for use in electro-optic ports, and more particularly, to shields that prevent electromagnetic emissions from optical fiber link modules.

BACKGROUND OF THE INVENTION

In order to transfer data between computer systems rapidly and reliably, electro-optic data transmission is increasingly being used as the method of choice. Optical fibers provide resistance to electromagnetic interference, increased security, and increased speed due to a wide potential band width. Optical fibers transmit data from an electro-optical transducer, such as a laser or Light Emitting Diode (LED) to an electro-optical receiver that generates electrical information based upon the signal received. An optical fiber includes a core region that is coated by an annular clad. The core region has an index of refraction greater than that of the clad, so that light is transmitted through the core by total internal refraction. The optical fibers are typically either threaded onto the electro-optical components or latched by the use of connectors such "SC" connectors.

State of the art optical links operate at over 1000 Mbits/second that generates very high electro-magnetic emissions in the range of 100 MHZ–5 GHz. FCC regulations constrain the field strength of radiated emission from certain unintentional radiators such as personal computers, CPU boards, power supplies, and peripherals. FCC regulations provide that the radiated emission from such unintentional radiators at a distance of three meters shall not exceed the following values:

| Frequency of emmision MHZ | Field Strength (micro volts/meter) |
|---|---|
| 30–88 | 100 |
| 88–216 | 150 |
| 216–960 | 200 |
| Above 960 | 500 |

In order to limit such emissions, external shielding has been used around the electro-optical component of such optical links. These shields provide an opening that allows threaded or "SC" type connectors to attach to the electro-optical components. Since these connectors are typically plastic they do not serve as a shield to emissions. This electromagnetic "hole" in the shield allows electromagnetic inference to escape the shielded area and may cause the equipment to exceed the maximum values provided for radiated emissions as specified by the FCC.

Consequently, a significant need continues to exist in the art for a shield that will block electro-magnetic interference from escaping from the shielded area. Specifically, a significant need continues to exist for a cost effective shield that blocks significant amounts of the emissions yet allows quick, easy and reliable connection to the electro-optic component.

SUMMARY OF THE INVENTION

The invention addresses these and others problems associated in the art with radiated electro-magnetic emissions from electro-optical components in a high speed data transfer system. The present invention provides an internal shield with at least one aperture to allow the connector portion of an electro-optic component to pass through for connection to an optical fiber. By providing an internal shield, electromagnetic interference (EMI) is substantially reduced without interfering with the mechanical connection.

In certain embodiments of the invention, the internal shield includes a thin metallic sheet having an aperture to receive the connector portion of an electro-optical component. In a shield for an input/output device, that includes an optical signal generator and optical signal receiver, the shield may include two bores. The first bore receives the connector portion of the generator and the second aperture receives the connector portion of the receiver.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

Figure 1:
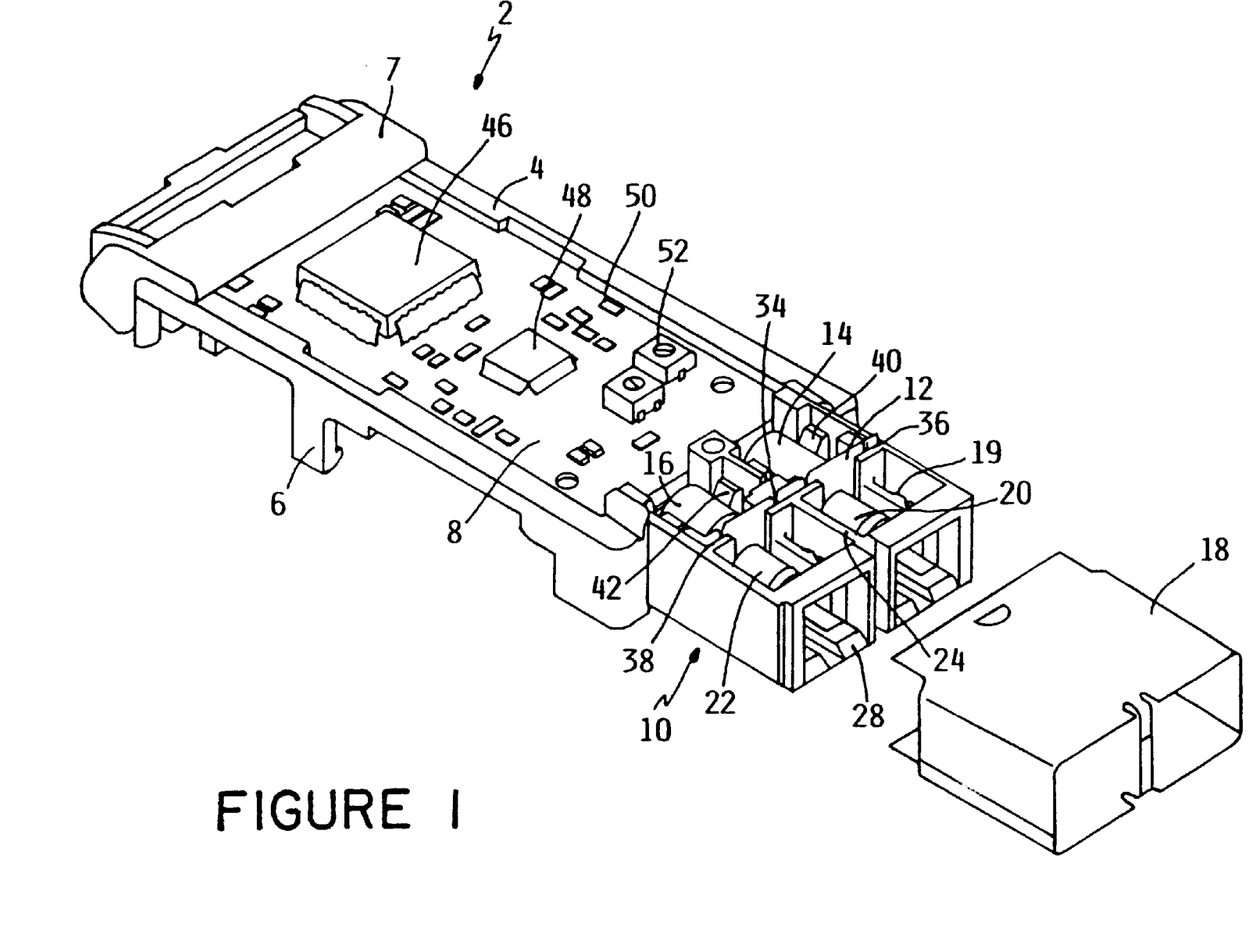
FIG. 1 is a partially exploded perspective view showing an optical link module incorporating an internal shield consistent with the present invention.

Turning to the Drawings wherein like numbers denote like parts throughout the several views, FIG. 1 illustrates the general configuration of an exemplary optical link module 2 and shows the basic operation of the various embodiments of the present invention. Optical link module 2 represents a fiber optic communications package which is mounted within a component of a data transfer system such as a computer system that transfers data to and from another component of the computer system or other computer systems such as network servers, mid-range computers, main-frame computers, work stations, desktop computers, portable computers, and the like. One such suitable computer system in which the optical link module 2 may be suitably used is a mid-range computer such as the AS/400 computer available from International Business Machines Corporation. The optical link module is also suitable for use in other communications systems or optical transmission networks, such as those used in telephone service.

The optical link module 2 generally includes a frame 4 that is integrally connected to a latching mechanism 6 and an optical fiber connection unit 10. Frame 4, latches 6 and optical fiber connecting unit 10 generally surround a printed circuit board 8. The frame includes a release lever 7, which when raised separates pin connection 5 and latches 6 from the host system. The printed circuit board 8 typically carries integrated circuit chips 46, 48, as well as other electronic components such as resistors 50 and potentiometers 52. Typically, the circuit board 8 includes a module that performs parallel electrical signal to serial optical conversion at rates of approximately 1000 Mbits/sec. The module also performs serial optical to parallel electrical conversion at a similar rate.

Transmitter and receiver integrated circuits are typically located on one side of the circuit board to provide duplex operation. A pair of electro-optical components, namely an emitter 14 and a receiver 16, perform the conversion between electrical and optical signals. Typically the module receives serial electrical signals from the CPU and emitter 14, such as an LED or laser, converts the serial electrical signal to a serial optical signal for transmission through an optical fiber. The module may also receive parallel electrical signals from a CPU and convert the parallel electrical signal to a serial electrical signal that is provided to the emitter 14. Emitter 14 in turn converts the serial electrical signal to a serial optical signal for transmission through an optical fiber. Similarly, incoming serial optical signals are converted by a receiver 16, such as a PIN photodiode, from the optical signal to a serial electrical signal. The serial electrical signal may be output to the CPU as a serial signal or converted to a parallel electrical signals and transmitted to the CPU. Similarly, emitter 14 and receiver 16 may transmit a parallel signal in which case it is possible to omit the parallel to serial conversion or it may be possible to convert a serial electrical signal to a parallel signal for parallel optical transmission.

Figure 5:
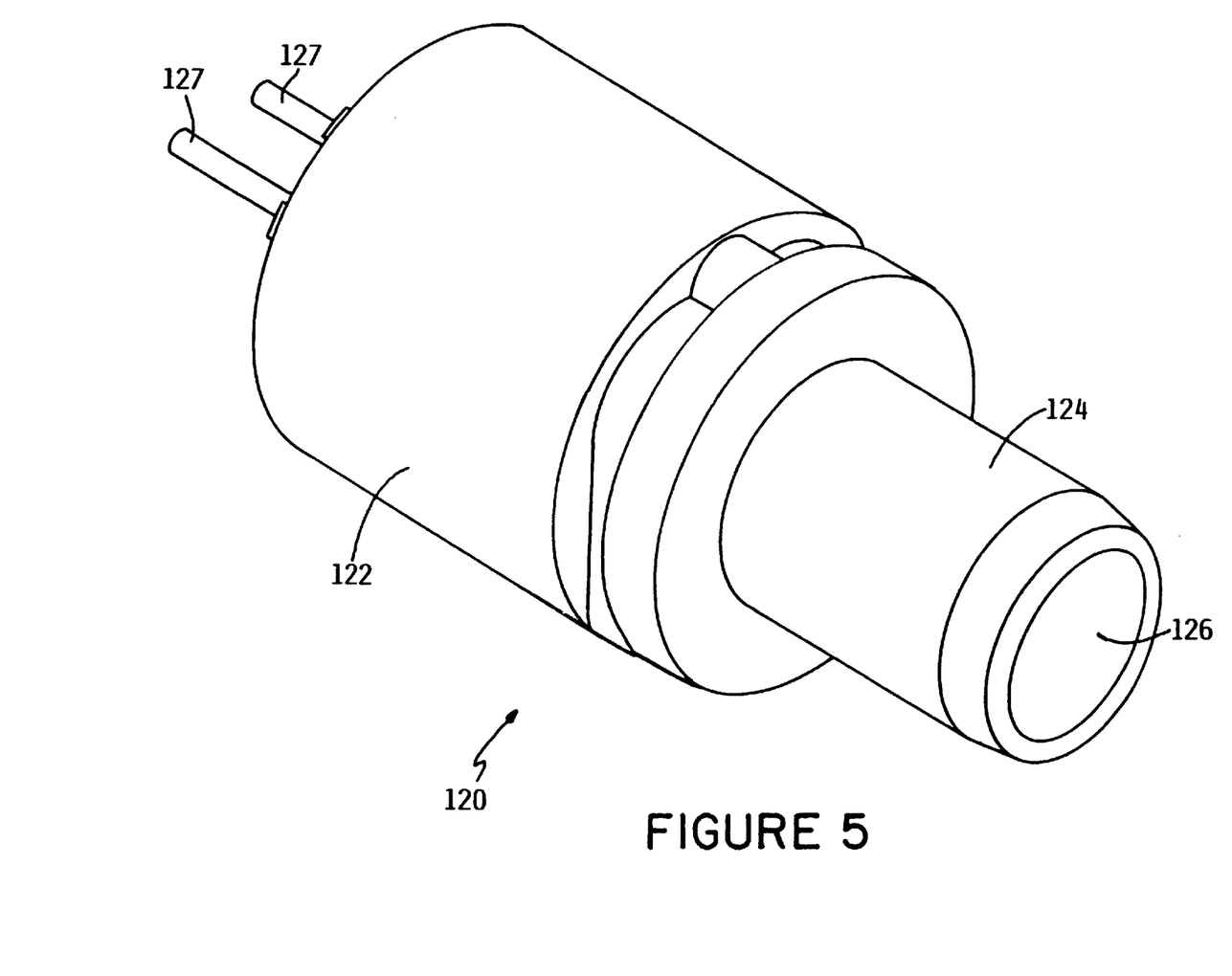
FIG. 5 is a perspective view of an optical component suitable for mounting in the optical link module of FIG. 1.

The circuit board 8 is wired to emitter 14 or laser and optical receiver 16 by leads 127. The emitter 14 and receiver 16 are each held within optical fiber connection unit 10 by pairs of cantilevered opposed latching arms 40, 42. Emitter 14 and receiver 16 each include an optical fiber receiving mechanism 120, as shown in FIG. 5. The optical fiber receiving mechanism 120 includes a cylindrical portion 122 in which the emitter or receiver is embedded. A hollow cylindrical projection 124 extends from the larger section 122. The diameter of the hollow cylindrical section 124 is typically on the order of 4.6 mm with an internal bore 126 with a diameter on the order of 2.5 mm. It should be understood that both the emitter 14 and the receiver 16 have such an optical fiber receiving mechanism 120. For clarity, the distal end of the emitter that receives a ferrule is labeled 20 in FIG. 1, and the distal end of the receiver is labeled 22 in FIG. 1. The large cylindrical portions of the optical fiber receiving mechanisms of the emitter 14 and receiver 16 are held within cantilevered latching arms 40, 42.

Figure 2:
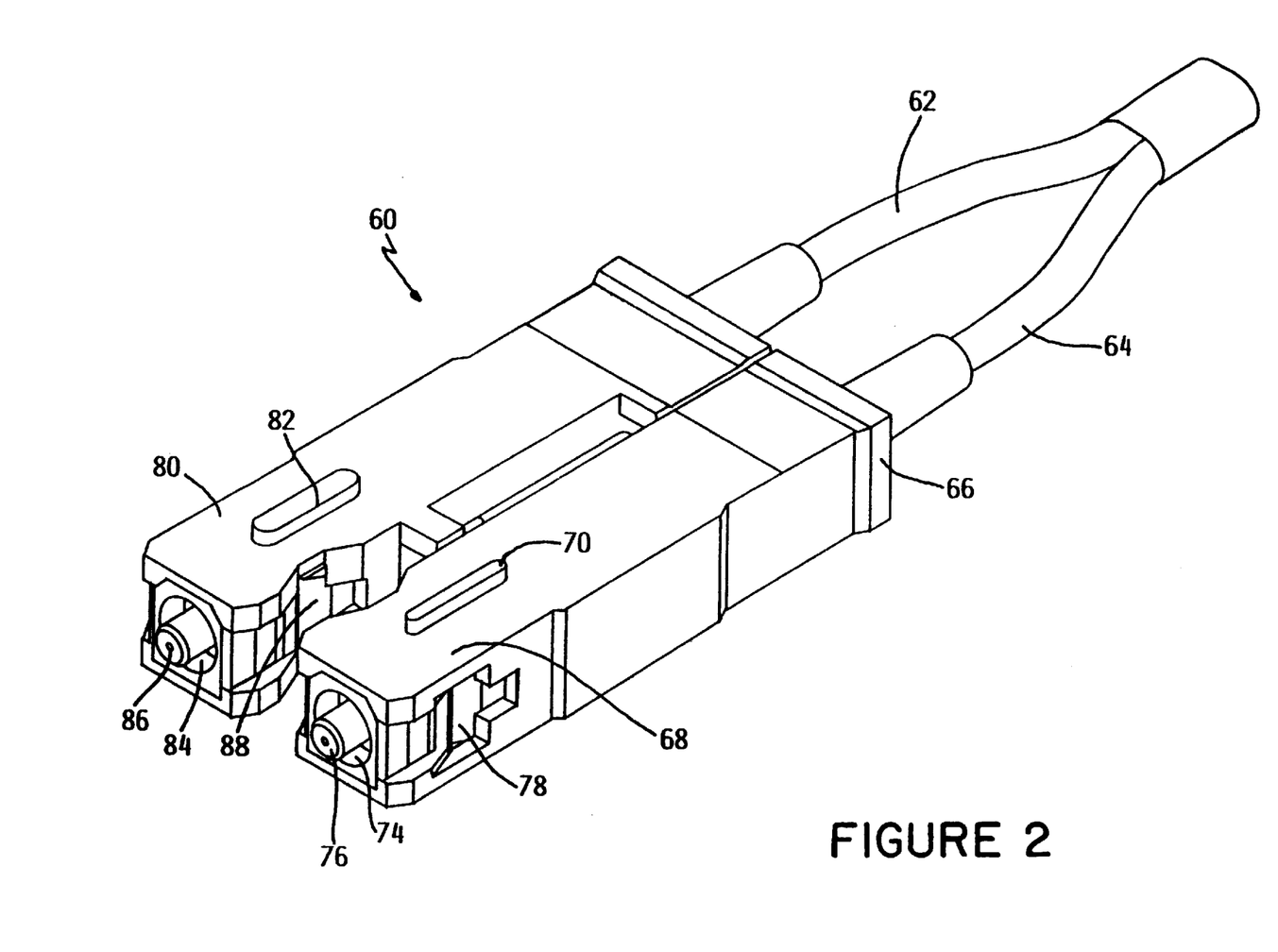
FIG. 2 is a perspective view of the male end of a duplex "SC" optical connector.
Figure 3:
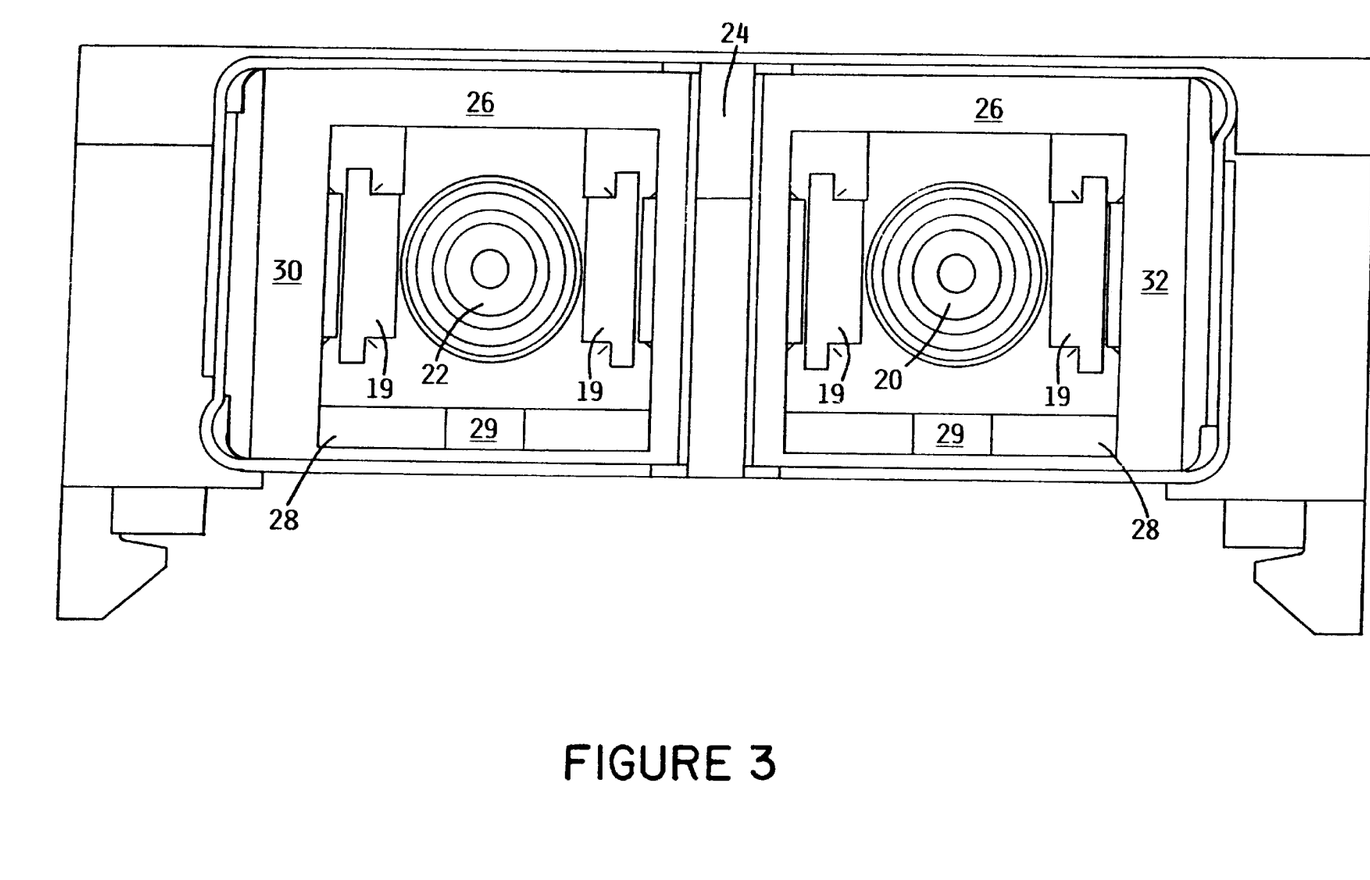
FIG. 3 is a plan view of the female end of a duplex "SC" connector.

With reference to FIG. 1, the optical fiber connection unit 10 is typically an injection molded unit that is attached to the optical link module frame 4. The optical fiber connection unit 10 includes a lower platform 28 that supports emitter 14, receiver 16, and the female end of a duplex "SC" connector. A suitable connection unit is disclosed in U.S. Pat. No. 5,901,263 entitled "Hot Pluggable Module Integrated Lock/Extraction Tool" to Gaio et al., which is incorporated in its entirety by reference herein. The lower surface 28 supports left and right side walls 30, 32, respectively as viewed in FIG. 3. Lower surface 28 also supports a medial T-shaped bar 24 that separates the send and receive fiber connectors of the duplex "SC" connectors 60, as shown in FIG. 2. Grooves 29 are located on the lower surface 28 to receive ridges 70, 82 (shown in FIG. 2) of the male duplex "SC" connector.

Figure 6:
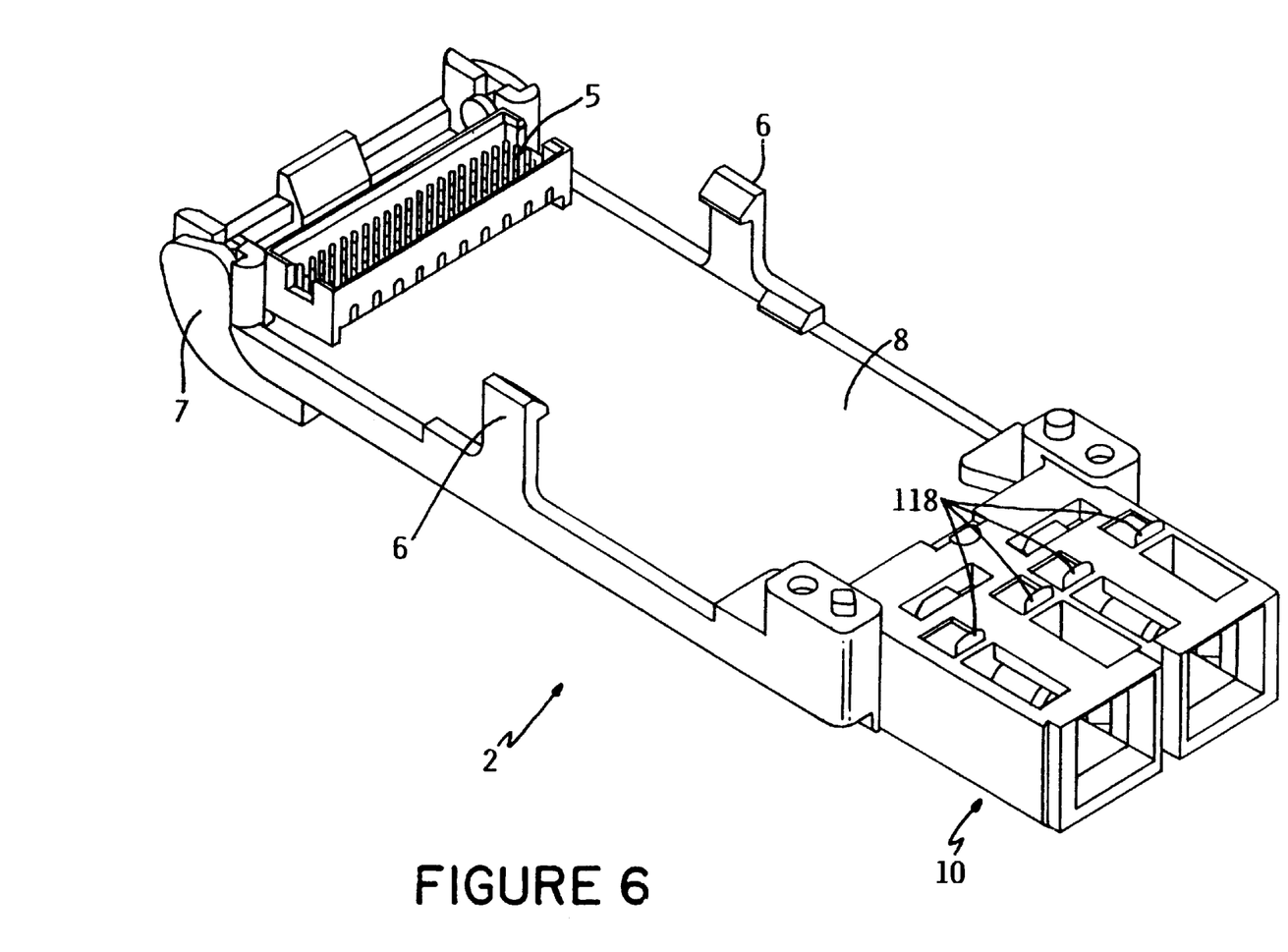
FIG. 6 is a perspective view showing the underside of the optical link module of FIG. 1.

Unit 10 of FIGS. 1 and 6 also retains an internal shield 12 within an internal cavity therein supported by lower platform 28. Internal shield 12 is fabricated from a thin sheet of a metal possessing good electromagnetic interference (EMI) characteristics, such as gold, silver and what is known in the art as nickel silver which is 59 percent by weight copper, 12 percent by weight nickel, and 29 percent by weight zinc. Sheets on the order of 3 mm in thickness provide suitable EMI characteristics. Side walls 30, 32 of unit 10 include shield retainers 36, 38 extending transverse thereto. In addition, a central shield retainer 34 is defined by the top section of the medial T-shaped bar 24 that is the same plain as retainers 36, 38.

An external shield 18 is fabricated from a thin sheet of an EMI shielding material such as gold, silver, or nickel silver. Shield 18 is slidably received over unit 10 to cooperatively shield the same with internal shield 12.

Figure 4:
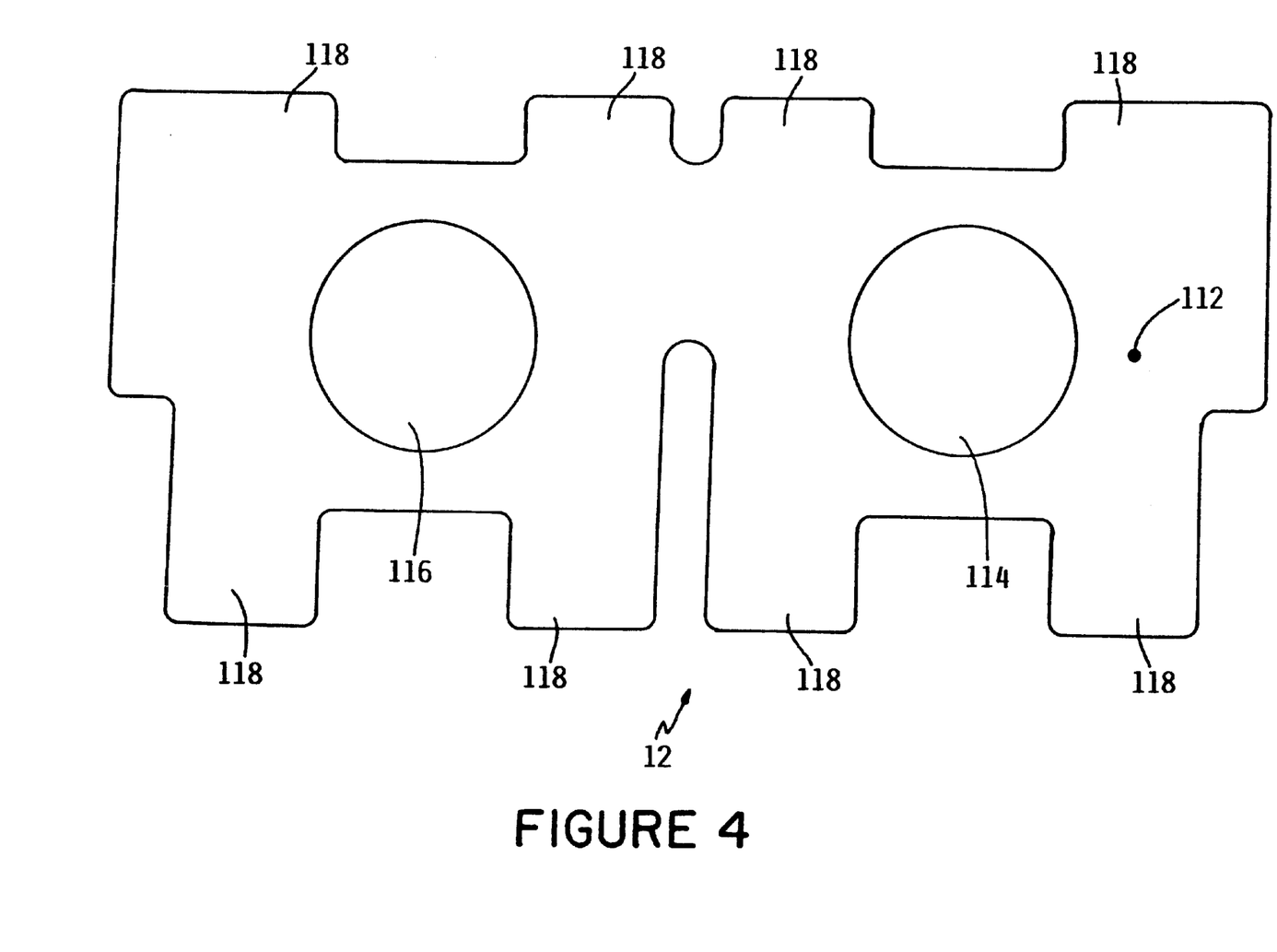
FIG. 4 is a plan view of an internal electromagnetic interference shield consistent with the present invention.

In assembling the optical link module 10, the apertures 114, 116 shown in FIG. 4 of shield 12 are slipped over the distal ferrule receiving ends of the emitter and receiver 20, 22, respectively. The emitter 14 and receiver 16 are then snapped in place between cantilevered arms 40, 42. Shield 12 is maintained on the emitter and receiver between the large cylindrical portion 122 of the optical fiber receiving mechanisms 120 therefor and the shield retainers 34, 36, 38. As shown in FIG. 6, tabs 118 extend from the lower platform 28 of the optical fiber connection unit 10.

Once the receiver 14, emitter 16 and shield 12 are in place, external shield 18 is slid over the optical fiber connection unit 10 to fold ears 118, and snapped into place with detent of cantilevered arms 19. The contact between the internal and external shield provides a path to ground any errant electrical charge. The internal shield 12 may include one or more tabs 118 on the upper and/or lower surfaces thereof to minimize gaps that could allows the escape of EMI. Shield 12 is vertically dimensioned so that tabs 118 are folded over by the sliding of external shield 18.

After the external shield is applied, the male end of the duplex "SC" connector, show in FIG. 2, 60 is inserted. Optical fibers 62, 64 pass through the back plate 66 of the male end of the duplex "SC" connector 60. Connector 60 includes a fiber connector 68 that is generally in the form of a right rectangular parallelepiped having a medial ridge 70 to ensure proper alignment. The medial ridge 70 mates with grove 29 that is included in the lower surface 28 of the optical fiber connection unit 10. The connector portion 68 includes a cylindrical bore 74 at the center of which a ferrule 76 is located. The optical fiber 64 is threaded through the back plate 66 and through ferrule 76. The connection unit 68 is inserted into optical fiber connection 20 unit 10 so that ferrule 76 is received within bore 126 of the distal ferrule receiving end of emitter 14. The optical fiber receiving unit 68 includes depressed regions 78 on opposite sides to receive the detents of cantilevered arms 19.

Similarly, connector 60 includes another fiber connector 80, which is of the same structure as fiber connector 68. The medial ridge 82 mates with grove 29 included in the lower surface 28 of the optical fiber connection unit 10. The cylindrical bore 84 includes a ferrule 86 having optical fiber 62 threaded therethrough. The connection unit 80 is inserted into optical fiber connection unit 10 so that ferrule 86 is received within bore 126 of the distal ferrule receiving end 22 of receiver 16. The optical fiber receiving unit 80 includes depressed regions 88 on opposite sides to receive the detents of cantilevered arms 19.

Figure 7A:
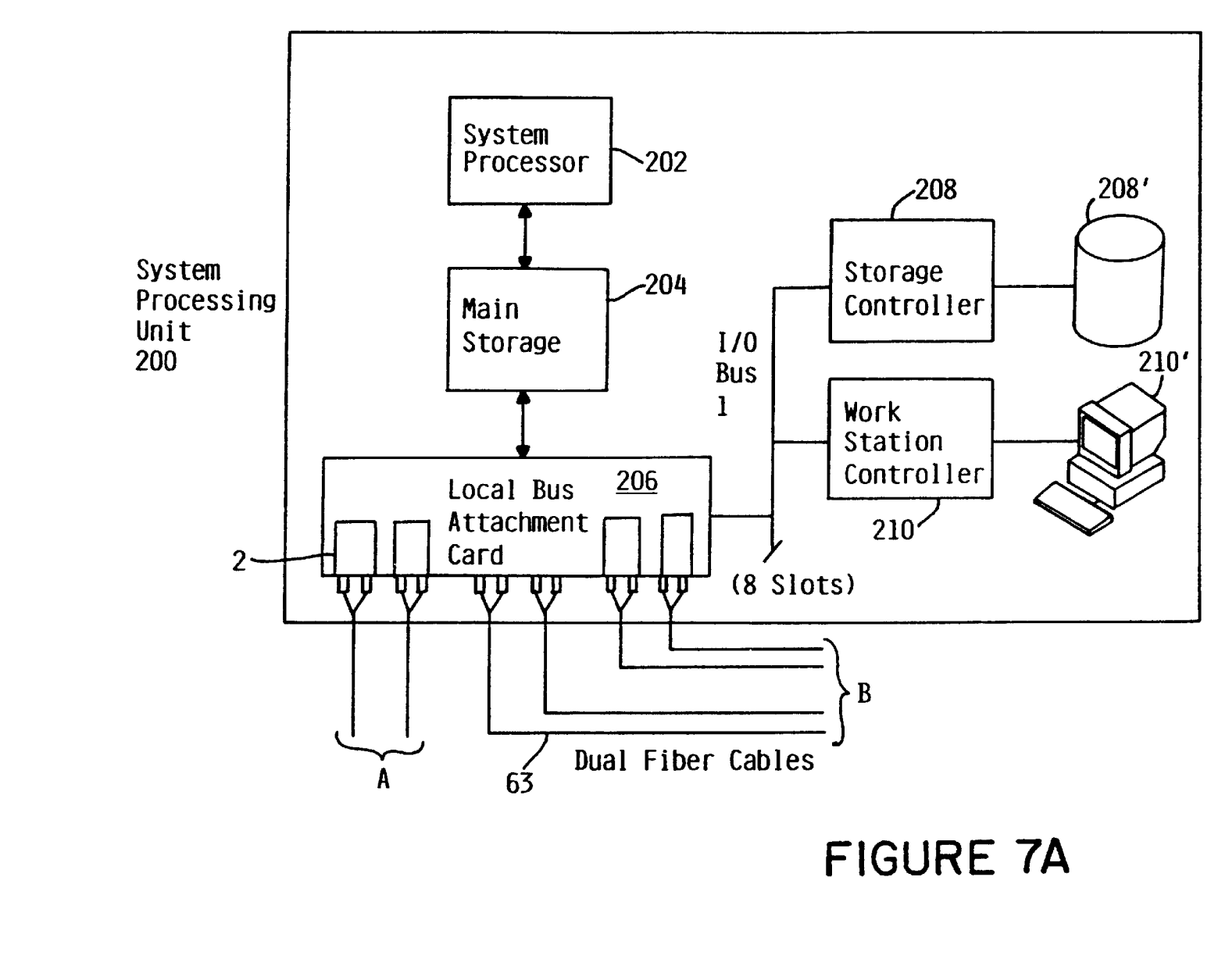
FIGS. 7A–7C illustrate a typical computer system using the module of the present invention.
Figure 7B:
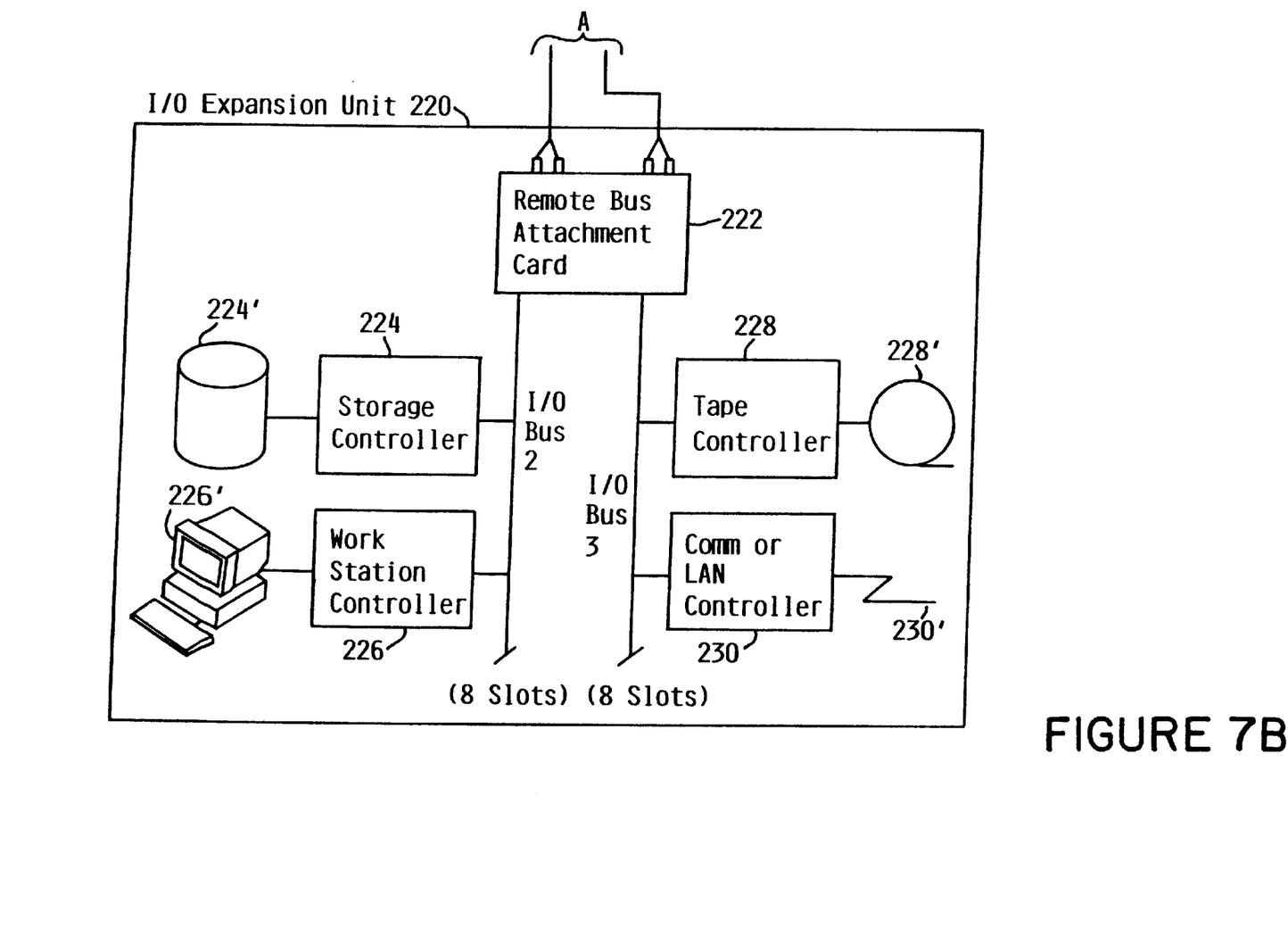
Figure 7C:
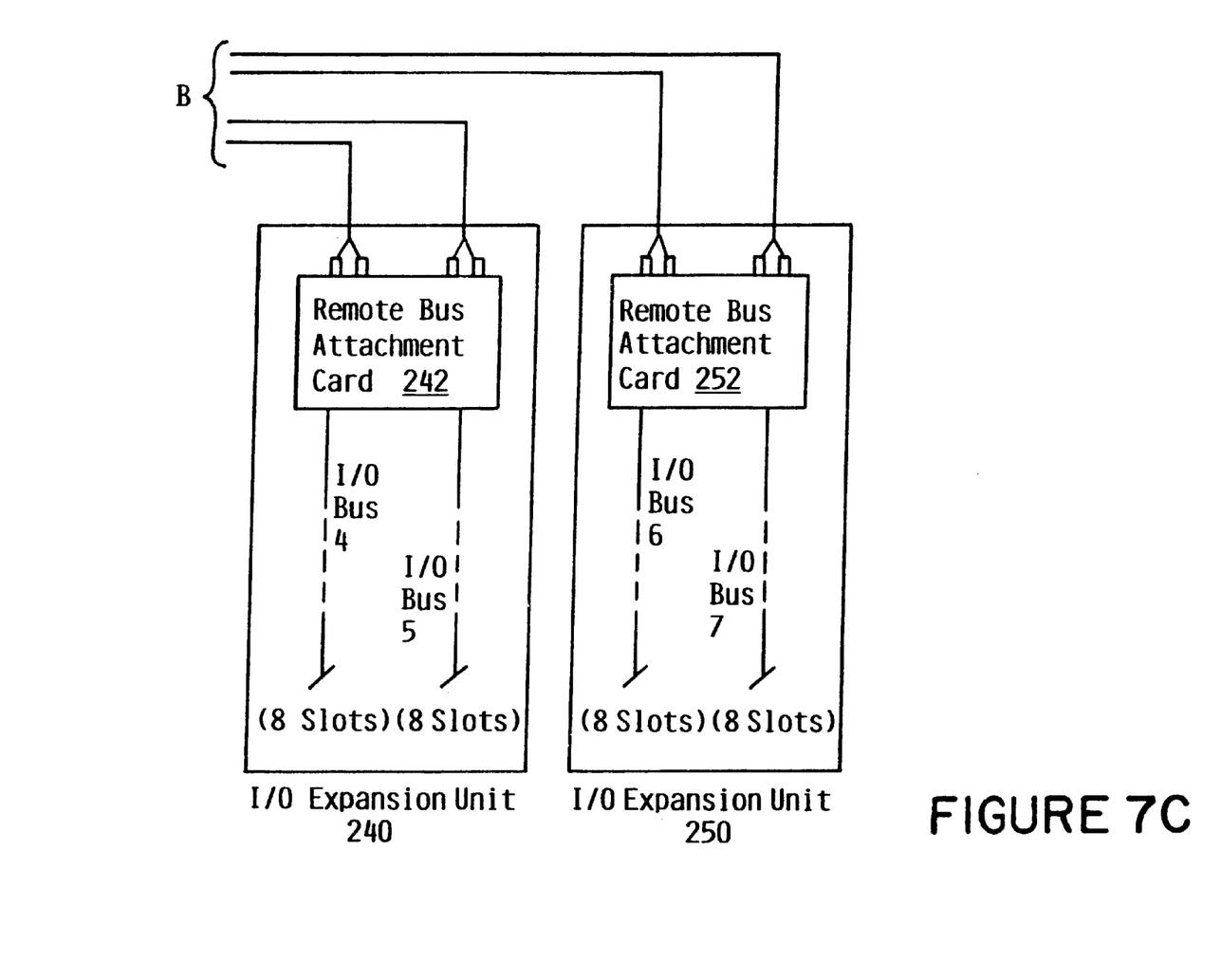

As seen in FIGS. 7A–7C, a typical computer system using module 2 may include a system processing unit 200 including a system processor 202, a main storage unit 204, a local bus attachment card 206 including modules 2, a storage controller 208, with storage device 208', and work station controller 210, with work station 210'. The local bus attachment card 206 connects system processing unit 200 to input/output expansion units 220, 240 and 250 by dual fiber cables 63. Input/output expansion unit 220, includes remote bus attachment card 222, linked via I/O buses to storage controller 224, with storage device 224', work station controller 226, with work station 226', tape controller 228, with tape drive 228', and a comm or LAN controller 230, with comm or LAN 230'. Input/output expansion unit 240, includes remote bus attachment card 242, linked via I/O buses to various components (not shown). Input/output expansion unit 250, includes remote bus attachment card 252, linked via I/O buses to various components (not shown).

It should be appreciated that the above-described internal EMI shield may be implemented in any number of manners known in the art. In particular, the above-described shielded duplexed "SC" connector could be configured as a single "SC" connector or the connect could be any other known type of connector. Other configurations of optical links may also be used with the internal shield of the present invention. It should be appreciated that implementation of the internal shield with other optical links is well within the capabilities of one of ordinary skill in the art.

Various modifications may be made to the illustrated embodiments without departing from the spirit and scope of the invention. Therefore, the invention lies solely in the claims hereinafter appended.

What is claimed is:

1. A data transfer system including an internally shielded optical fiber link module, the optical fiber link module comprising:
    a frame with an optical fiber connection unit;
    an electronic circuit mounted within the frame;
    first and second electro-optical components, connected to the electronic circuit, each having a distal ferrule receiving end; and
    an internal electromagnetic shield, mounted within the optical fiber connection unit and having two apertures sized to receive the distal ferrule receiving ends of the first and second electro-optical components.

2. The data transfer system of claim 1, wherein the internal electromagnetic shield comprises a sheet of a metallic material.

3. The data transfer system of claim 2, wherein the metallic material is selected from the group consisting of gold, silver, copper and nickel or alloys thereof.

4. The data transfer system of claim 2, wherein the metallic material comprises about 12 percent by weight nickel, 59 percent by weight copper, and 29 percent by weight zinc.

5. The data transfer system of claim 1, wherein the optical fiber link module further comprises an external shield enclosing the optical fiber connection unit.

6. The data transfer system of claim 1, wherein the internal electromagnetic shield includes at least one foldable ear portion.

7. The data transfer system of claim 6, wherein the at least one foldable ear portion is folded by the application of an external shield around the optical fiber connection unit.

8. The data transfer system of claim 1, wherein the distal ferrule receiving ends of the first and second electro-optical components are cylindrical.

9. The data transfer system of claim 1, wherein the optical fiber connection unit includes at least one tab configured to retain the internal electromagnetic shield on the distal ferrule receiving ends of the first and second electro-optical components.

10. The data transfer system of claim 1, further comprising:
    a memory;
    a processor coupled to the memory; and
    a bus coupled to the processor and configured to interface the optical fiber link module with the processor.

11. A data transfer system including an internally shielded optical fiber link module, the optical fiber link module comprising:
    a frame with an optical fiber connection unit;
    an electronic circuit mounted within the frame;
    an electro-optical component, connected to the electronic circuit and having a distal ferrule receiving end; and
    an internal electromagnetic shield, mounted within the optical fiber connection unit and having an aperture sized to receive the distal ferrule receiving end of the electro-optical component.

12. The data transfer system of claim 11, wherein the optical fiber link module further comprises a second electro-optical component having a distal ferrule receiving end, wherein the internal electromagnetic shield has a second aperture sized to receive the distal ferrule receiving end of the second electro-optical component.

13. The data transfer system of claim 11, wherein the internal electromagnetic shield comprises a sheet of a metallic material.

14. The data transfer system of claim 11, wherein the metallic material is selected from the group consisting of gold, silver, copper and nickel or alloys thereof.

15. The data transfer system of claim 11, wherein the metallic material comprises about 12 percent by weight nickel, 59 percent by weight copper, and 29 percent by weight zinc.

16. The data transfer system of claim 11, wherein the optical fiber link module further comprises an external shield enclosing the optical fiber connection unit.

17. The data transfer system of claim 11, wherein the internal electromagnetic shield includes at least one foldable ear portion.

18. The data transfer system of claim 17, wherein the at least one foldable ear portion is folded by the application of an external shield around the optical fiber connection unit.

19. The data transfer system of claim 11, wherein the distal ferrule receiving end of the electro-optical component is cylindrical.

20. The data transfer system of claim 11, wherein the optical fiber connection unit includes at least one tab configured to retain the internal electromagnetic shield on the distal ferrule receiving end of the electro-optical component.

21. The data transfer system of claim 11, further comprising:
 a memory;
 a processor coupled to the memory; and
 a bus coupled to the processor and configured to interface the optical fiber link module with the processor.

22. A computer system, comprising:
 a memory;
 a processor coupled to the memory; and
 an internally shielded optical fiber link module coupled to the processor, the optical fiber link module comprising:
 a frame with an optical fiber connection unit;
 an electronic circuit mounted within the frame;
 an electro-optical component, connected to the electronic circuit and having a distal ferrule receiving end; and
 an internal electromagnetic shield, mounted within the optical fiber connection unit and having an aperture sized to receive the distal ferrule receiving end of the electro-optical component.

\* \* \* \* \*